(12) United States Patent
Yoshida et al.

(10) Patent No.: US 8,671,621 B2
(45) Date of Patent: Mar. 18, 2014

(54) VEHICLE WINDOW OPENING/CLOSING DEVICE

(75) Inventors: Yasushi Yoshida, Kiryu (JP); Masayuki Tamura, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 253 days.

(21) Appl. No.: 12/672,558

(22) PCT Filed: Aug. 6, 2008

(86) PCT No.: PCT/JP2008/064116
§ 371 (c)(1),
(2), (4) Date: Feb. 8, 2010

(87) PCT Pub. No.: WO2009/022601
PCT Pub. Date: Feb. 19, 2009

(65) Prior Publication Data
US 2011/0283622 A1    Nov. 24, 2011

(30) Foreign Application Priority Data
Aug. 10, 2007  (JP) ................................ 2007-209371

(51) Int. Cl.
*E05F 11/48*  (2006.01)

(52) U.S. Cl.
USPC .......................................................... 49/352

(58) Field of Classification Search
USPC .................................... 49/352, 348, 349, 502
See application file for complete search history.

(56) References Cited

U.S. PATENT DOCUMENTS

| | | | | |
|---|---|---|---|---|
| 4,899,608 A | * | 2/1990 | Knappe et al. | 74/411 |
| 5,066,878 A | * | 11/1991 | Sekine et al. | 310/68 C |
| 5,074,077 A | * | 12/1991 | Toyoshima et al. | 49/352 |
| 5,267,482 A | * | 12/1993 | Yoshida et al. | 74/425 |

(Continued)

FOREIGN PATENT DOCUMENTS

| | | |
|---|---|---|
| DE | 69734070 T2 | 6/2006 |
| DE | 112005000472 T5 | 2/2007 |

(Continued)

OTHER PUBLICATIONS

International Search Report for corresponding PCT application No. PCT/JP2008/064116, dated Sep. 16, 2008, 7 pages.

(Continued)

*Primary Examiner* — Katherine Mitchell
*Assistant Examiner* — Scott Denion
(74) *Attorney, Agent, or Firm* — McCormick, Paulding & Huber LLP

(57) ABSTRACT

A vehicle window opening/closing device 1 comprises: an inversion pulley 12 provided to an upper portion of a guide rail 10; a drive mechanism 14 provided, in line, to a lower end of the guide rail 10, and constituted so that a speed reduction mechanism including a worm and a worm wheel, and a drum connected concentrically with the worm wheel are received into a same housing 15; a close-side cable 24, whose one end is fixed to the drum and whose other end is coupled to a carrier plate 11 via the inversion pulley 12; an open-side cable 25, whose one end is fixed to the drum and whose other end is coupled directly to the carrier plate 11; and an electric motor 17 having an armature coupled mechanically to the worm, the electric motor being capable of being coupled to the drive mechanism 14.

20 Claims, 14 Drawing Sheets

(56) References Cited

U.S. PATENT DOCUMENTS

| | | | |
|---|---|---|---|
| 5,505,022 A * | 4/1996 | Shibata et al. | 49/352 |
| 5,564,231 A * | 10/1996 | Tajima et al. | 49/352 |
| 5,799,441 A * | 9/1998 | Shibata | 49/352 |
| 6,088,965 A * | 7/2000 | Fukumoto et al. | 49/352 |
| 6,393,929 B1 | 5/2002 | Quere et al. | |
| 6,408,572 B1 * | 6/2002 | Uchimura et al. | 49/352 |
| 7,032,290 B2 * | 4/2006 | Hirano et al. | 29/596 |
| 7,051,479 B2 * | 5/2006 | Chonavel et al. | 49/506 |
| 7,190,095 B2 * | 3/2007 | Matsuyama | 310/68 R |
| 7,350,334 B2 * | 4/2008 | Smith | 49/352 |
| 2001/0026104 A1 * | 10/2001 | Shimizu et al. | 310/71 |
| 2002/0047347 A1 * | 4/2002 | Torii et al. | 310/68 B |
| 2003/0066244 A1 * | 4/2003 | Staser et al. | 49/375 |
| 2003/0102767 A1 * | 6/2003 | Adachi | 310/239 |
| 2003/0140562 A1 * | 7/2003 | Staser et al. | 49/352 |
| 2003/0188490 A1 * | 10/2003 | Kraus et al. | 49/348 |
| 2005/0229493 A1 * | 10/2005 | Ootsuki et al. | 49/352 |
| 2006/0055257 A1 * | 3/2006 | Mizutani et al. | 310/71 |
| 2006/0130405 A1 * | 6/2006 | Hemond et al. | 49/352 |
| 2006/0244321 A1 * | 11/2006 | Mizutani | 310/68 R |
| 2007/0044382 A1 * | 3/2007 | Moriyama et al. | 49/352 |
| 2007/0251148 A1 * | 11/2007 | Watson et al. | 49/352 |
| 2009/0001829 A1 * | 1/2009 | Uchimura et al. | 310/83 |
| 2009/0255186 A1 * | 10/2009 | Uchimura | 49/358 |
| 2010/0060092 A1 * | 3/2010 | Blakesley et al. | 310/83 |
| 2010/0164333 A1 * | 7/2010 | Uchimura et al. | 310/68 B |

FOREIGN PATENT DOCUMENTS

| | | |
|---|---|---|
| JP | 634543 | 7/1989 |
| JP | 9021272 A | 1/1997 |
| JP | 9049369 A | 2/1997 |
| JP | 10315760 A | 12/1998 |
| JP | 2001248357 A | 9/2001 |
| JP | 2002218699 A | 8/2002 |
| JP | 2004120847 A | 4/2004 |
| JP | 2004197442 A | 7/2004 |
| JP | 3560850 B2 | 9/2004 |
| JP | 2006101615 A | 4/2006 |

OTHER PUBLICATIONS

Office Action and English Translation received in Japanese Patent Application Serial No. 2007-209371 dated Dec. 27, 2012.

Office Action and English Translation received in German Patent Application Serial No. 11 2008 002 170.8 dated Apr. 20, 2012.

* cited by examiner

VEHICLE WINDOW OPENING/CLOSING DEVICE

CROSS REFERENCE TO RELATED APPLICATIONS

This application is entitled to the benefit of and incorporates by reference essential subject matter disclosed in International Patent Application No. PCT/JP2008/064116 filed on Aug. 6, 2008 and Japanese Patent Application No. 2007-209371 filed on Aug. 10, 2007.

TECHNICAL FIELD

The present invention relates to a vehicle window opening/closing device, which draws by a cable a sorrier plate supporting a window glass of a vehicle and causes it to rise and fall along a guide rail.

BACKGROUND ART

Side doors of an automobile are provided with cable-driven type vehicle window opening/closing devices. In the device, the carrier plate that supports the window glass of the vehicle is movably assembled to the guide rail, and each of both upper and lower ends of the guide rail is provided with a drum and an inversion pulley; a dose-side cable played out from the drum is coupled to the carrier plate via the inversion pulley; an open-side cable played out from the drum is coupled directly to the carrier plate; and the drum is driven by an electric motor to cause the carrier plate to rise and fall along the guide rail (see Japanese Patent Application Laid Open Publication No. 9-49369).

Alternatively, also known is a device in which a drive source is located on a lateral side of the guide rail and which a dose-side cable and an open-side cable are played out therefrom to be coupled to the carrier plate (see Japanese Patent No. 3560850).

DISCLOSURE OF THE INVENTION

In the former window opening/closing device, however, the electric motor and the drum are received in different housings, and located so as to sandwich the guide rail therebetween. Therefore, a width of a drive mechanism increases, and a restriction of layout to the side door becomes strict since making the side door thin is required for enlarging a space in a vehicle compartment.

Meanwhile, in the latter device, since the guide rail and the drive source are independently constituted, a large locating space is required, and the restriction of layout to the side door becomes further strict, as well as the number of assembling steps with respect to the side door increases, whereby this becomes a factor of an increase in costs.

An object of the present invention is to provide a vehicle window opening/closing device, in which a drive mechanism is made thin, the entire device is made compact, and a degree of freedom of layout is enhanced.

A vehicle window opening/closing device according to the present invention is a device drawing, by a cable, a carrier plate supporting a window glass of vehicle to cause the window glass to rise and fall along a guide rail, the device comprising: an inversion pulley provided to one end portion of the guide rail; a drive mechanism coupled integrally to the other end portion of the guide rail, and receiving into a same housing a speed reduction mechanism including a worm and a worm wheel, and a drum connected concentrically with the worm wheel; a close-side cable, whose one end is fixed to the drum and whose other end is coupled to the carrier plate via the inversion pulley; an open-side cable, whose one end is fixed to the drum and whose other end is coupled directly to the carrier plate; and an electric motor having an armature coupled mechanically to the worm, the electric motor being capable of being coupled to the drive mechanism.

It is desirable that: the housing includes a housing main body formed into a bottomed cylindrical shape having an opening, and a cover member; a support shaft is protrudingly provided on a bottom wall of the housing; and the worm wheel and the drum are rotatably supported by the support shaft; and the housing is closed by the cover member.

It is desirable that: a guide rail mounting portion is formed integrally with the housing of the drive mechanism; a slit, into which the other end portion of the guide rail is capable of being inserted, is formed in the guide rail mounting portion; and the guide rail is inserted into and fixed to the slit.

It is desirable that the electric motor comprises: a motor housing formed into a bottom cylindrical shape whose one end has an opening; a brush holder provided inside the motor case; an armature shalt having the armature and a commutator with which a brush supported by the brush holder slidably contacts, the armature shaft being rotatably supported by the motor housing; a connector unit including a clipping portion disposed so as to overlap with the brush holder axially and clipped and fixed between the electric motor and the housing of the drive mechanism, and a power-feeding connector portion formed integrally with the clipped portion and disposed outside the motor housing; a brush-side connecting terminal provided in the brush holder and electrically connected to the brush; and a connector-side connecting terminal provided in the connector unit, electrically connected to a power-supply connecting terminal provided in the connector section, and electrically connected to the brush-side connecting terminal corresponding to the dipping portion disposed so as to overlap with the brush holder axially.

It is desirable that the clipping portion includes a seal member at a position of being sandwiched between the electric motor and the housing of the drive mechanism.

According to the present invention, since the speed reduction mechanism includes the worm and the worm wheel, and the drum connected concentrically with the worm wheel are received into the same housing, the drive mechanism are made thin; and also since the drive mechanism is coupled integrally to the end portion of the guide rail, the entire device can be made compact, and a degree of freedom of layout with respect to the vehicle body is enhanced. Further, since the drive mechanism and the electric motor can be mechanically coupled, assembling of the drive mechanism itself and/or assembling of guide rail can be carried out before assembling of the electric motor, whereby workability of the assembling can be improved.

Also, according to the present invention, the housing is constituted by the housing main body and the cover member, the worm wheel and the drum are rotatably supported by the support shalt provided protrudingly to the bottom wall of the housing, and then the housing is closed by the cover member. Therefore, assembling of respective elements constituting the drive mechanism is carried out from a single direction, and workability of assembling the drive mechanism is good.

Further, according to the present invention, the guide rail mounting portion is shaped integrally with the housing of the drive mechanism, and the other end portion of the guide rail is inserted into and fixed to the guide rail mounting portion, so that mounting of the guide rail becomes easy.

In addition, according to the present invention, since the connector unit with the power-feeding connector portion is formed separately from the brush holder, even when two or more kinds of vehicle window opening/closing devices different in a specification of the connector section correspondingly to the exterior connector are manufactured, the brush holder with a specification common to those of both members can be used. Therefore, versatility of the brush holder with respect to a specification difference of the exterior connector is enhanced, and the vehicle window opening/closing device can be reduced in cost.

BEST MODE FOR CARRYING OUT THE INVENTION

Hereafter, embodiments according to the present invention will be described in detail based on the accompanying drawings.

Figure 1:
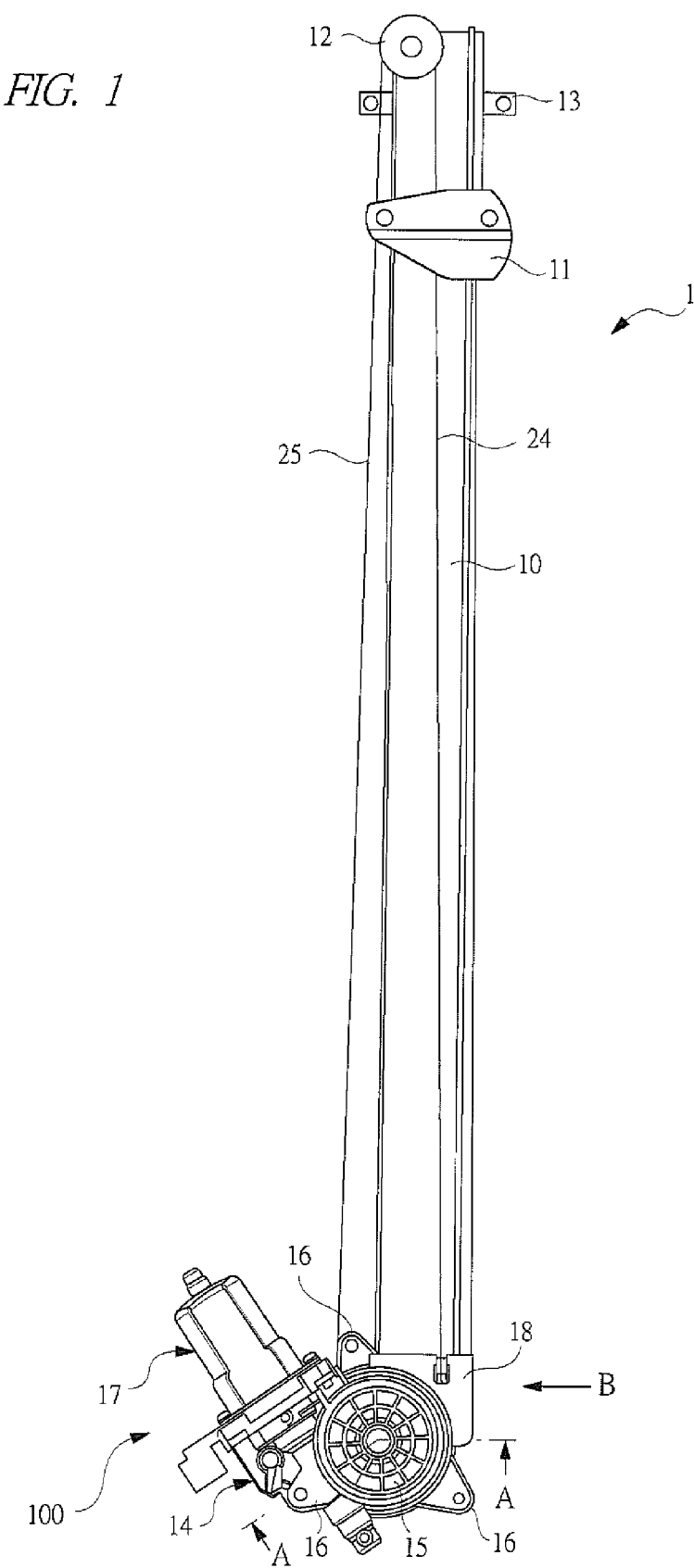
FIG. 1 is a front view showing a vehicle window opening/closing device according to the present invention.
Figure 2:
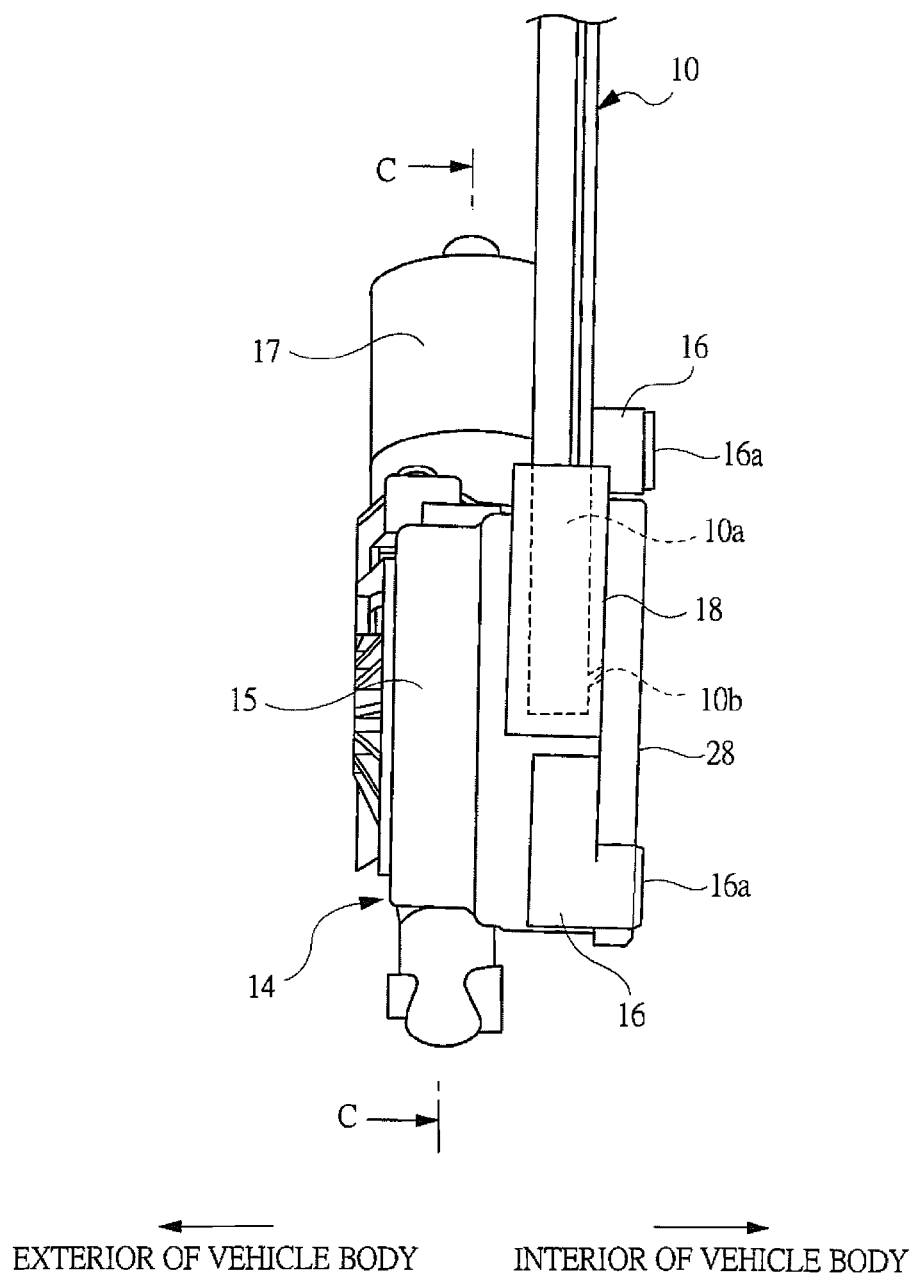
FIG. 2 is a view in which a drive mechanism of FIG. 1 is viewed from a direction of arrow B.

FIG. 1 is a front view showing a vehicle window opening/closing device according to the present invention; FIG. 2 is a view in which a drive mechanism of FIG. 1 is viewed from a direction of arrow B; and FIG. 3 is a sectional view taken along line A-A of FIG. 1.

A vehicle window opening/closing device 1 includes a guide rail 10, and longitudinally movably assembles thereto a carrier plate 11 supporting a window glass of a vehicle not shown. An inversion pulley 12 is rotatably fixed to an upper portion as one end portion of the guide rail 10, and a vehicle attaching bracket 13 is fixed thereto by welding etc. A drive mechanism is provided, in line, to a lower end as the other end portion of the guide rail 10, and a plurality of vehicle attaching leg portions 16 are shaped integrally with a housing main body 15a of a housing 15 of the drive mechanism. An electric motor 17 is coupled to the housing main body 15a of the drive mechanism 14 (hereafter, this unit is abbreviated to a "power window motor 100"). In the drive mechanism 14, a guide rail mounting portion 18 is shaped integrally with the housing main body 15a, and a slit (not shown) capable of inserting a lower end portion of the guide rail 10 is formed in the guide rail mounting portion 18. Also, the lower end portion 10a of the guide rail 10 is inserted into the slit, and its cut and raised piece 10b is engaged with a hole (not shown) of the housing 15 (see FIG. 2).

Figure 3:
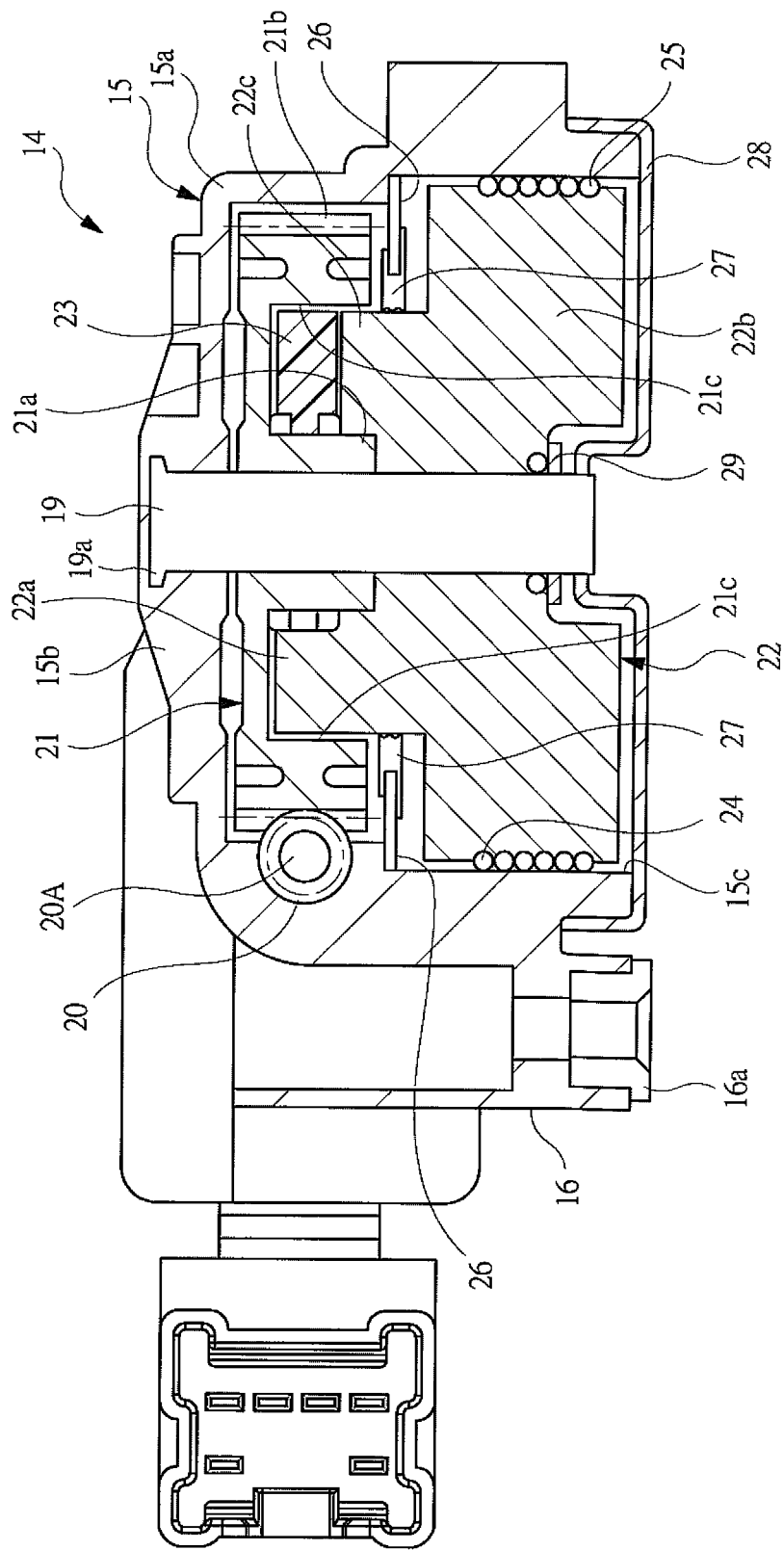
FIG. 3 is a sectional view taken along line A-A of FIG. 1.

The housing 15 of the drive mechanism 14 is formed, as shown in FIG. 3, into a bottomed cylinder shape so as to have an opening 15c at one end, and a support shaft 19 is provided protrudingly from a bottom wall 15b of the housing. As described later, this support shaft 19 is fixed, in a state of being protrudingly provided, by embedding into a resin a flange portion 19a formed at an axial end of the metal support shaft 19 when the housing 15 is resin-molded. In the housing 15, as described later, a worm 20 coupled to an armature shaft 118 of the electric motor 17 is supported rotatably. A worm wheel 21 and a drum 22 are rotatably supported on the support shaft 19, and a teeth portion 21b of the worm wheel 21 meshes with the worm 20 so as to make power transmittable therebetween. The worm wheel 21 is coupled to the drum 22 via a damper 23. The damper 23 is an elastic body, which couples like a ring a plurality of damper main bodies and is made of a rubber material, and the damper is received in a link portion 21c provided annularly between a hub portion 21a and the teeth portion 21b of the worm wheel. A plurality of radiate void portions (not shown) are formed circumferentially at evenly spaced intervals between the damper main bodies of the damper 23, and a rib (not shown) of the worm wheel 21 and a rib 22a of the drum 22 are alternately engaged with the void portions. Note that a structure of coupling the worm wheel 21 and the drum 22 by the damper 23 is well known, and so its detailed description will be omitted (see Japanese Patent No. 3560850).

The drum 22 has a large diameter portion 22b and a small diameter portion 22c, wherein a cable winding groove is formed in a circumferential face of the large diameter portion 22b to wind a close-side cable 24 and an open-side cable 25 therein. One end of the close-side cable 24 is fixed on a one-side end face of the drum 22 and wound up to the predetermined number of turns, and the other end thereof is coupled to the carrier plate 11 via the inversion pulley 12. Meanwhile, one end of the open-side cable 25 is fixed to the other-side end face of the drum 22 and wound up to the predetermined number of turns in a direction reverse to the close-side cable 24, and the other end thereof is coupled directly to the carrier plate 1.

A ring plate 26 is fixedly provided in an inner face of the housing 15, and a seal lip 27 is attached to an inner circumference of the ring plate. Also, by making this seal lip 27 slidably contact with the small diameter portion 22c of the drum 22, rain water that has led to the drum 22 in the housing 15 via the respective cables 24 and 25 is prevented from intruding into a worm wheel 21 side. Note that in FIG. 3, the reference numeral "28" denotes a lid as a cover member which constitutes part of the housing 15 and closes the opening 15c of the housing main body 15a; "29" a C-ring mounted on the support shaft 19 to secure the worm wheel 21 and the drum 22 which are assembled to the support shalt 19; and "16a" nut members provided integrally with the leg portions 16 to fix the drive mechanism 14 to a vehicle body.

This vehicle window opening/closing device 1 is assembled to a predetermined structure body located inside a side door (not shown) of the vehicle body while the guide rail is directed vertically, and a lower end of the carrier plate 11, which supports a window glass of a vehicle not shown, is supported. When the electric motor 17 rotates the worm 20, the drum 22 is deceleratingly rotated to wind up the close-side cable 24, and the open-side cable 25 is played out from the drum 22, whereby the carrier plate 11 rises along the guide rail 10 to close and stop the window glass. When the electric motor 17 is reversely rotated, the window glass is opened.

In this vehicle window opening/closing device 1, since a speed reduction mechanism having the worm 20 and the worm wheel 21, and the drum 22 linked concentrically with the worm wheel 21 are received in the same housing 15, the drive mechanism 14 is made thin. Further, since the drive mechanism 14 is provided, in line, at the lower end of the guide rail 10 and fixed to the vehicle body, the entire device can be also made compact, and a degree of freedom of layout to the vehicle body becomes enhanced.

Further, when the drive mechanism 14 is assembled, the worm wheel 21, damper 23, and drum 22 can be inserted into and assembled in the support shalt 19 from the opening 15*c* that is one side of the housing 15, and can be finally closed by the lid 28. Therefore, efficiency of work of assembling the drive mechanism 14 is extremely good.

Also, when the guide rail 10 and the drive mechanism 14 are linked, since it is only required to insert the lower end portion 10*a* of the guide rail 10 into the slit of the housing 15, there is advantage regarding workability and cost.

Figure 4:
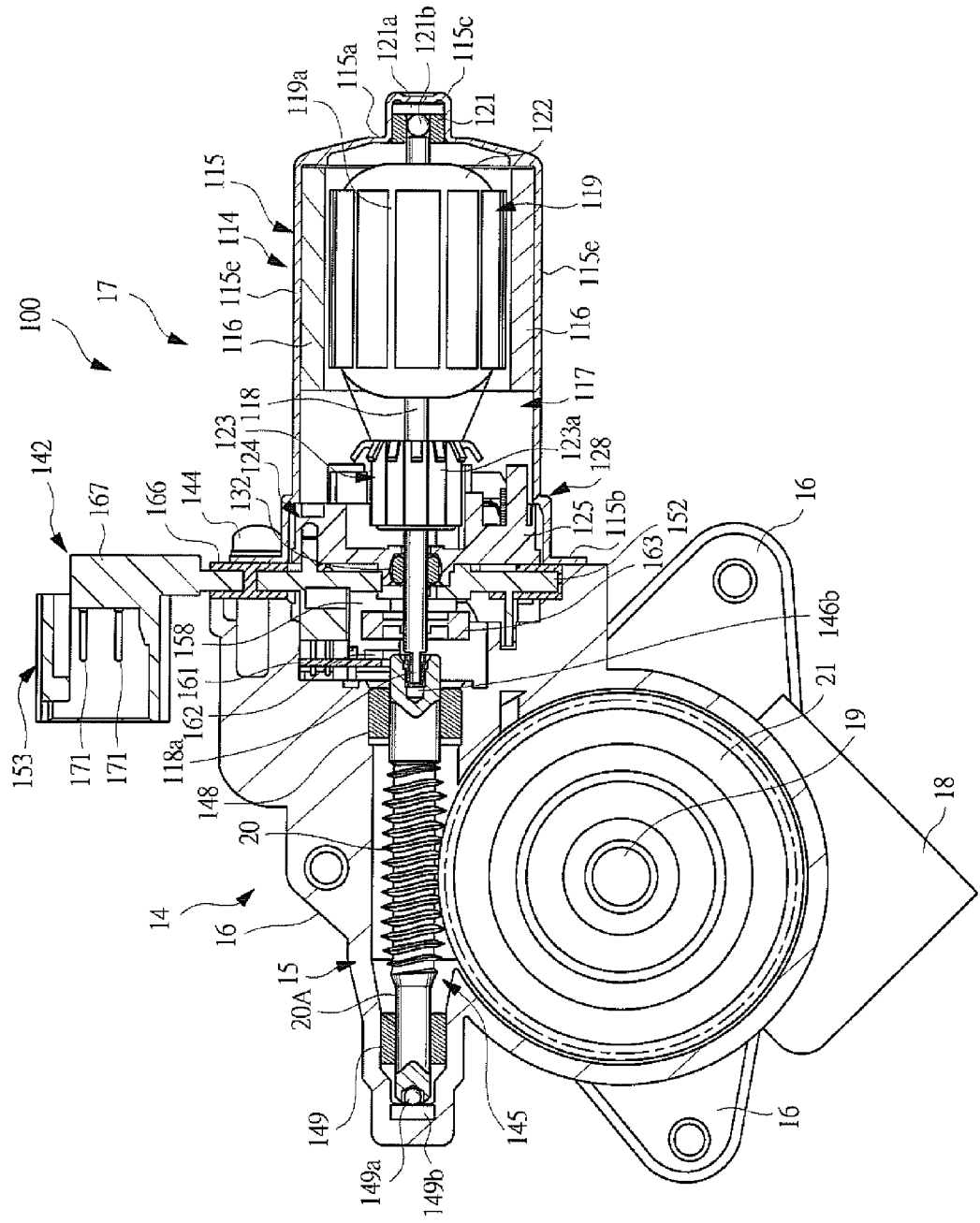
FIG. 4 is a sectional view taken along line C-C of FIG. 2.
Figure 5:
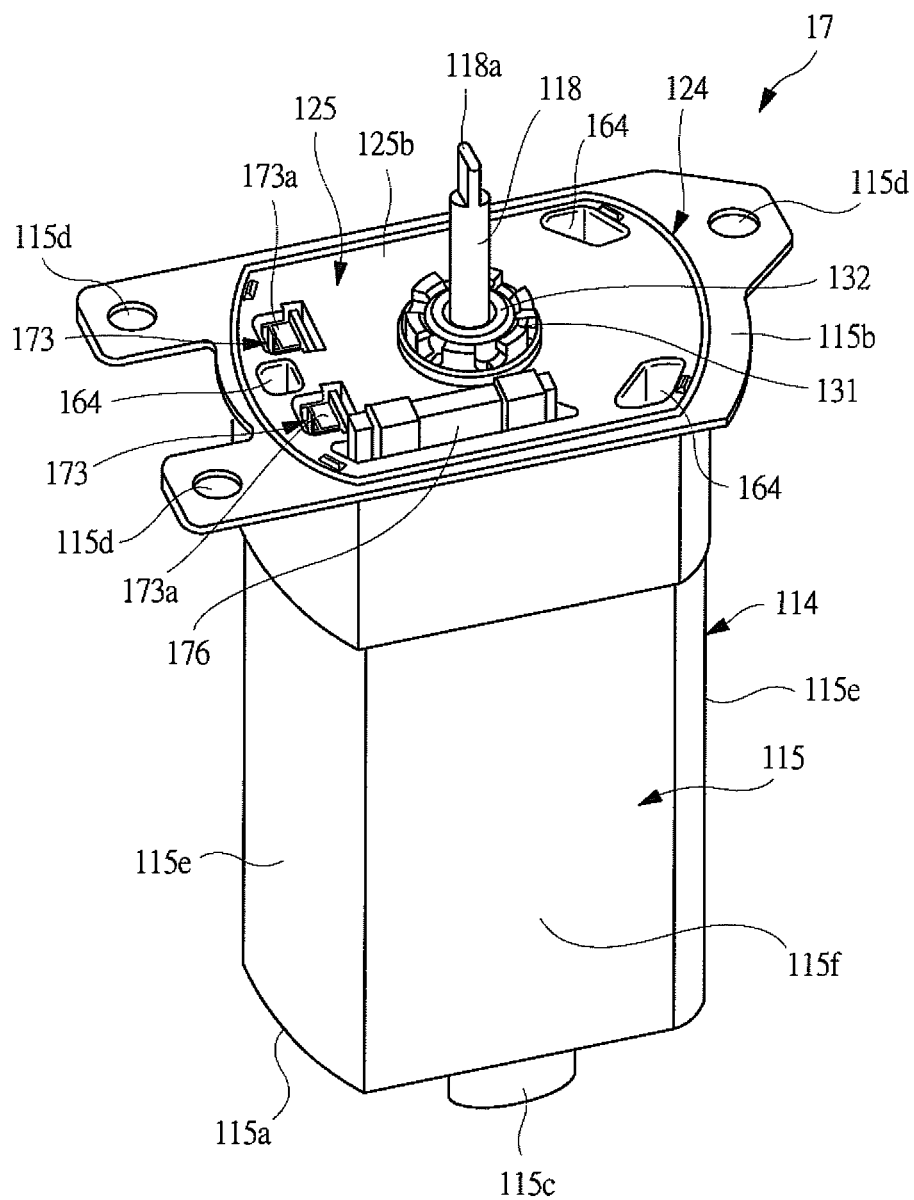
FIG. 5 is a perspective view showing a detail of a motor main body illustrated in FIG. 4.
Figure 6:
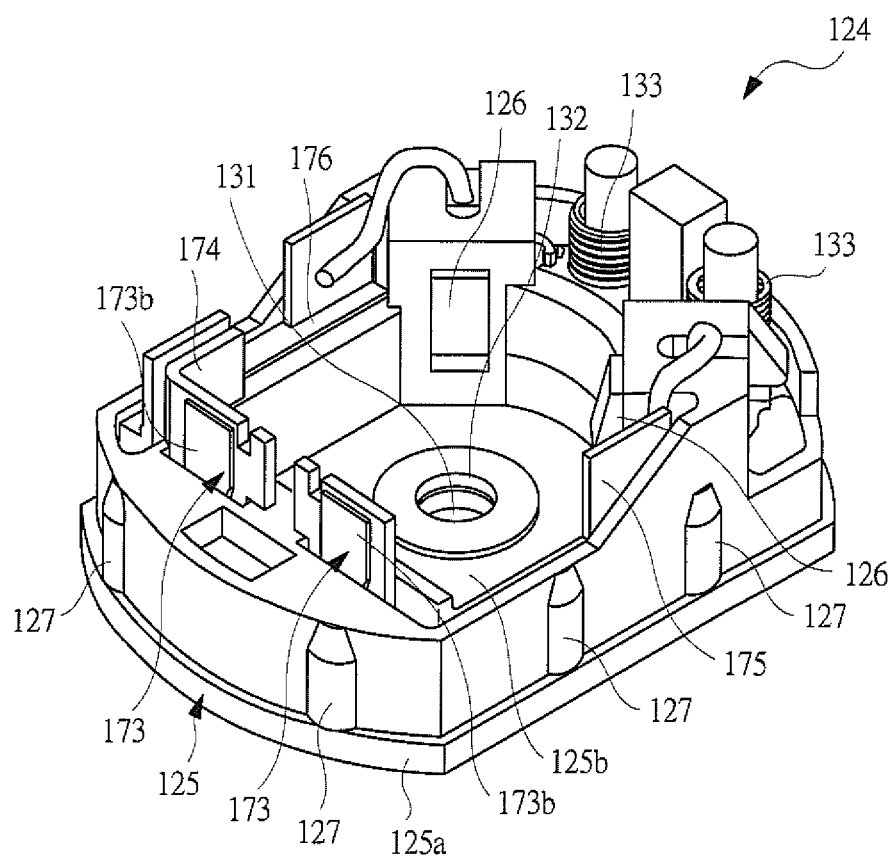
FIG. 6 is a perspective view showing a detail of a brush unit illustrated in FIG. 4.
Figure 7:
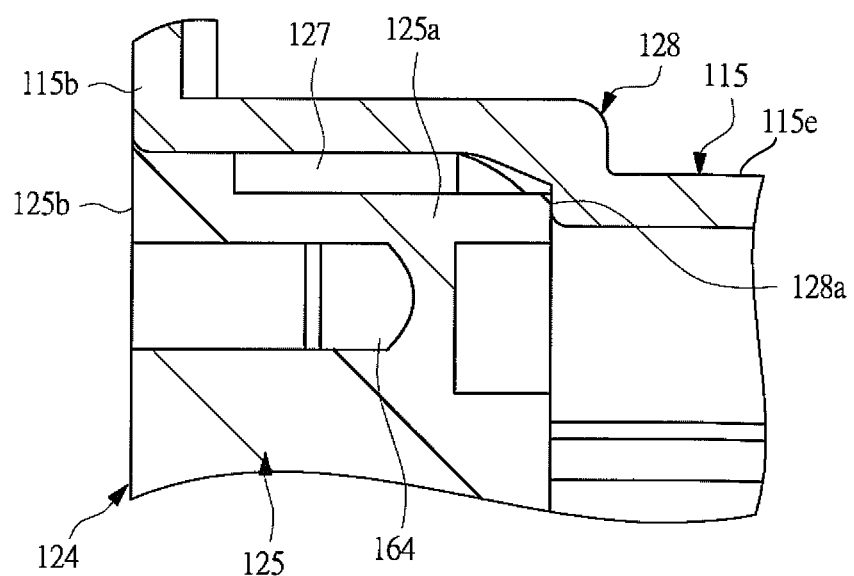
FIG. 7 is a sectional view showing a positioning structure of a brush holder into a motor yoke.

Next, a description will be made of a structure of the vehicle window opening/closing device 1 according to the present invention with reference to FIG. 4. FIG. 4 is a sectional view taken along line C-C of FIG. 2; FIG. 5 is a perspective view showing a detail of the electric motor 17 illustrated in FIG. 4; FIG. 6 is a perspective view showing a detail of a brush unit illustrated in FIG. 4; and FIG. 7 is a sectional view showing a positioning structure of a brush holder into a motor yoke.

The vehicle window opening/closing device 1 includes a power window motor 100, and a stator 114 of the electric motor 17 includes, as shown in FIGS. 4 and 5, a motor yoke 115 as a motor case. The motor yoke 115 is formed into a bottomed cylinder shape by performing a drawing processing to a steel plate as a conductor using a press apparatus etc., the bottomed cylinder shape having a substantially oval-like cross section, one end in an axial direction thereof having an opening, and the other end being closed by a bottom wall portion 115*a*, wherein an opening end thereof is provided with a flange portion 115*b* that protrudes radially. The oval-like motor yoke 115 includes arc surfaces 115*e* and flat surfaces 115*f*. Inside the arc surface 15*e*, as shown in FIG. 4, a pair of magnets 116 as field members is fixed so as to oppose their homopoles to each other, and pseudo heteropoles are formed on the flat surfaces 115*f* since heteropoles located at back faces of the respective magnets 116 uses as a magnetic path the arc surfaces 115*e* and flat surfaces 115*f* of the motor yoke 115 to lead to the flat surfaces 115*f*. Therefore, a magnetic field is created around the motor yoke 115 by the motor yoke 115 and those magnets 116. Note that three screw holes 115*d* are provided openly in the flange portion 115*b*.

Incidentally, in an example shown in Figure, the container-like motor yoke 115 formed by performing a drawing processing to a steel plate is used as a motor case; however, the motor case is not limited to such an example, and may be such a container-like member that one end of a yoke main body formed into a cylinder using, for example, a steel plate is closed by a cover member formed of a resin etc.

An armature 117 is received in the motor yoke 115, and this armature 117 has an armature shaft 118. One end of the armature shaft 118 is rotatably supported radially by a bearing 121 provided in a bearing supporting portion 115*c* of the bottom wall portion 115*a* of the motor yoke 115, and is rotatably supported in a thrust direction by a steel plate 121*a* disposed inside the bearing supporting portion 115*c*, and a steel ball 121*b* disposed between the armature shaft 118 and steel plate 121*a*. Accordingly, the armature shaft 118 is rotatably supported in the motor yoke 115.

An armature core 119 is fixed to the armature shaft 18 so as to be put within a magnetic field created by the magnets 116. The armature core 119 is formed into a columnar shape by laminating axially plate-like steel materials that are conductors, and a plurality of slots 119*a* that are open to an outer circumference of the armature core are provided circumferentially alongside. A plurality of armature coils 122 are mounted in each of the slots 119*a* by a lap winding, and those armature coils 122 are intended to rotate with the armature core 119, i.e., armature shaft 118.

A commutator 123 is fixed on the armature shaft 118 so as to be adjacent to the armature core 119 axially. The commutator 123 has a plurality of segment pieces 123*a* arranged circumferentially, and coil ends of the armature core 122 are electrically connected to the segment pieces 123*a* so as to correspond to one another.

To feed a drive current to each of the armature coils 122 via the commutator 123, a brush unit 124 is mounted inside the motor yoke 115. As shown in FIG. 6, the brush unit 124 includes a resin-made brush holder 125 and a pair of brushes 126 held by the brush holder 125.

This brush holder 125 is formed by injection-molding of a resin material and, as shown in FIG. 6, includes an annular ring portion 125*a* whose exterior is formed into a substantially oval shape that conforms with an inner-face shape of an opening of the motor yoke 115; and a plate-like base portion 125*b* formed integrally with an axial-directional end portion of the ring portion 125*a*. Further, the brush holder 125 is mounted inside the motor yoke 115 by the base portion 125*b* being outwardly inserted into the motor yoke 115 from a ring portion 125*a* side.

A plurality of ribs 127 are provided on an outer circumference of the ring portion 125*a* so as to extend axially (in a direction parallel to the armature shaft 118) and to protrude radially outwardly up to a predetermined height. As shown in FIG. 7, the brush holder 125 is mounted in the motor yoke 115 so that those ribs 127 slidably contact with inner faces of the arc surfaces 115*e* and flat surfaces 115*f* of the motor yoke 115. At this time, each of the ribs 127 is slightly elastically deformed radially inwardly by contacting with the inner faces of the motor yoke 115. Therefore, the brush holder 125 can be mounted into the inner faces of the motor yoke 115 by a slight press-fit, whereby the brush holder 125 is prevented from being carelessly released from the motor yoke 115. Also, as shown in FIG. 7, the inner face of the arc surface 115*e* of the motor yoke 115 is provided with a stepped portion 128 having an abutment surface 128*a* that is located at a predetermined depth position from the opening end by a drawing processing and is perpendicular to an axial direction. The brush holder 125 is positioned axially inside the motor yoke 115 so that by causing the axial-directional end portion of the ring portion 125*a* to abut on the stepped portion 128, i.e., the abutment surface 128*a*, the base portion 125*b* is substantially flush with the flange portion 115*b* of the opening end of the motor yoke 115.

Incidentally, in an example shown in Figure, the brush holder 125 is caused to abut on the abutment surface 128*a* of the stepped portion 128 provided to the motor yoke 115, thereby being positioned inside the motor yoke 115; however, the brush holder is not limited to such an example, and the brush holder 125 may be mounted inside the motor yoke 115 by a press-fit using, for example, an increase in a radial-outward protrusion amount of each rib 127, thereby being positioned inside the motor yoke 115 by the press-fit.

As shown in FIGS. 5 and 6, a center of axis of the base portion 125b is provided with a through hole 131, and a bearing (metal bearing) 132 is mounted in the through hole 131, whereby the other end side of the armature shaft 118 is intended to be rotatably supported by the bearing 132. Thus, when the brush holder 125 is mounted in the motor yoke 115, the one end of the armature shaft 118 is rotatably supported by the bottom wall portion 115a of the motor yoke 115, and the other end side thereof is rotatably supported by the brush holder 125. Therefore, even if the electric motor 17 is not coupled to the drive mechanism 14, the armature 117 becomes rotatable inside the motor yoke 115, and by feeding a power source to the pair of brushes 126, the electric motor 17 can be actuated as a single body.

As shown in FIG. 6, the brushes 126 are disposed 90 degrees away from each other in a rotating direction of the armature shaft 118, and are each held by the ring portion 125a of the brush holder 125. Further, when the brush holder 125 is mounted in the motor yoke 115, as shown in FIG. 4 the commutator 123 is disposed inside the ring portion 125a of the brush holder 125, and each of the pair of brushes 126 slidably contacts with an outer circumferential surface of the commutator 123 (segment piece 123a). In addition, the respective brushes 126 are movable backward and forward in directions of approaching and separating from the commutator 123, and are biased by a spring 133 mounted on each ring portion 125 so as to elastically slidably contact with the outer circumferential surface of the commutator 123.

Figure 8:
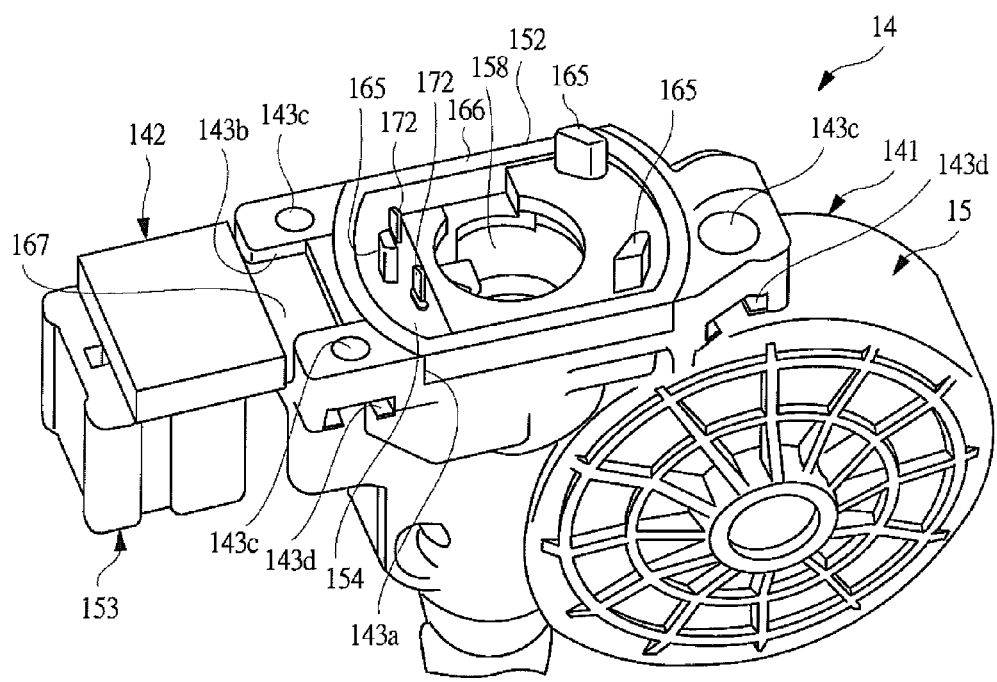
FIG. 8 is a perspective view showing a detail of a frame unit illustrated in FIG. 4.
Figure 9:
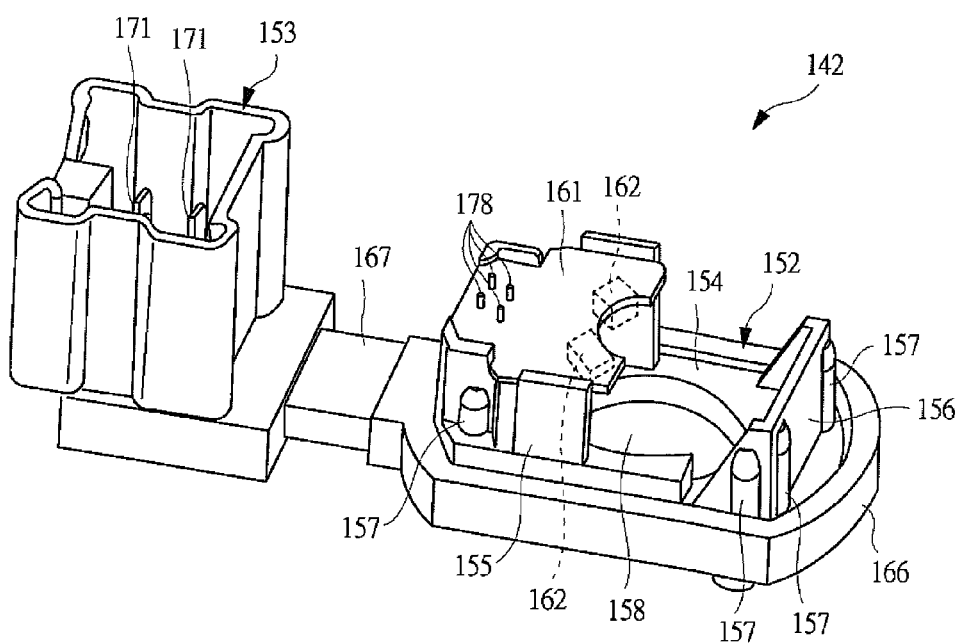
FIG. 9 is a perspective view showing a detail of a connector unit illustrated in FIG. 8.

FIG. 8 is a perspective view showing a detail of the drive mechanism 14 illustrated in FIG. 4, and FIG. 9 is a perspective view showing a detail of a connector unit 142 illustrated in FIG. 8. Note that FIG. 8 is shown by omitting the guide rail mounting portion 18.

As shown in FIG. 8, the drive mechanism 14 has a connector unit 142, and is constituted by mounting the connector unit 142 into the housing 12.

A housing main body 15a constituting the housing 15 of the drive mechanism 14 is formed into a predetermined shape by the injection-molding of a resin material, and is shaped by a so-called insertion-molding method in which the flange portion of the support shaft 19 is embedded during the molding. A face, which closes the opening of the motor yoke 115, is provided with a guide portion 143a and a guide portion 143b that function as guides in mounting the connector unit 142. Also, the housing 15 is provided with three screw holes 143c opposing to the three screw holes 115d of the motor yoke 115. Note that the reference numeral "143d" denotes a nut hole for inserting a unshown nut member at a position of the hole back of each screw hole 143c. Further, the opening of the motor yoke 115 is dosed by: inserting a fastening member (bolt etc.) 144 from each screw hole 115d provided in the opening end of the motor yoke 115, i.e., in the flange portion 115b; and fastening it to an unshown nut positioned in the nut hole 143d via each screw hole 143c of the housing 15.

As shown in FIG. 4, a speed reduction mechanism 145 is received inside the housing main body 15c. This speed reduction mechanism 145 is a so-called worm gear mechanism, and causes the worm 20 formed on a worm shaft 20A to mesh with the worm wheel 21.

The worm shaft 20A is rotatably received in the housing 15 so that its both end portions are rotatably supported radially by bearings 148 and 149. The worm 20 is formed integrally with an outer circumference of the worm shaft. Also, an concave portion is formed in a end face located at a bearing 149 side of the worm shaft 20A, and its interior is provided with a steel ball 149a, whereby the worm shaft is rotatably supported in a thrust direction by a thrust plate 149b disposed on a housing 15 side. In order to couple the worm shaft 20A to the armature shaft 118, one end of the worm shaft 20A located on an opening side of the housing 15 is provided with a coupling hole 146b, and a tip of the armature shalt 118 is provided with a coupling convex portion 118a. When the drive mechanism 14 and the electric motor 17 are coupled, the coupling convex portion 118a provided at the tip of the armature shalt 118 is inserted in the coupling hole 146b of the worm shalt 20A, whereby the worm shalt 20A is coupled mechanically to the armature shaft 118. Also, the worm wheel 21 is rotatably supported by the support shaft 19 so as to mesh with the worm 20. Therefore, when the armature shaft 118 rotates, its rotation speed is reduced by the worm shaft 20A, i.e., the worm 20 and worm wheel 21 up to the predetermined number of revolutions, and is transmitted to the drum 22.

The damper 23 is received in an accommodating portion 21c of the worm wheel 21, and ribs (not shown) of the worm wheel 21 and ribs 22a of the drum 22 are alternately engaged. Each one end of the cables 24 and 25 is secured to the drum 22, and they are wound around the drum 22 up to the predetermined number of turns. Under such a condition, the opening 15c of the housing main body 15a is dosed by the lid 28 constituting part of the housing 15.

Meanwhile, the connector unit 142 is made of a resin by an injection-molding of a resin material and, as shown in FIG. 9, includes a intermediate portion 152, and a power-feeding connector portion 153 formed integrally with the intermediate portion. The intermediate portion 152 is annularly formed so that its outer shape has a substantially oval shape conforming to an outer shape of the base portion 125b of the brush holder 125. Provided inside this intermediate portion 152 is a flat plate portion 154 that is integrated with the intermediate portion 152 and is perpendicular to the axial direction of the armature shaft 118. This plate portion 154 is provided integrally with a pair of skirt portions 155 and 156 that protrude axially toward the housing 15 side of the drive mechanism 14. When the intermediate portion 152 is guided by the guide portion 143a and those skirt portions 155 and 156 are inserted into the opening of the housing 15, the connector unit 142 is mounted into the housing 15.

An outer circumference of each of the skirt portions 155 and 156 is provided with a plurality of ribs 157, each of which extends axially and protrudes radially outwardly up to a predetermined height, and the skirt portions 155 and 156 are inserted into the housing 15 so that those ribs 157 contact with an inner surface of the housing 15 and are slightly elastically deformed radially. Therefore, the connector unit 142 is mounted into the housing 15 by a slight press-fit, and cannot be carelessly released from the housing 15.

A center of axis of the plate portion 154 is provided with a through hole 158, and when the drive mechanism 14 is assembled to the electric motor 17, the armature shaft 118 is coupled mechanically to the worm shaft 20A via the through hole 158.

Mounted inside the skirt portion 155 is a sensor substrate 161, which is disposed a predetermined distance away from the plate portion 154 and is parallel to the plate portion 154. A pair of Hall sensors 162 as rotating sensors is loaded on the sensor substrate 161, and those Hall sensors 162 are arranged so as to oppose axially to a ring magnet 163 fixed on the armature shaft 118. This ring magnet 163 has a plurality of magnetic poles evenly spaced circumferentially. Accordingly, when the armature shaft 118 rotates, a pulse signal with a cycle that is inversely proportional to the number of revolutions of the armature shaft 118 is outputted from each of the Hall sensors 162. Also, the Hall sensors are disposed so that their phases are shifted 90 degrees from each other in a rotating direction, whereby the rotating direction of the armature shaft 118 can be detected in order of occurrence of the pulse signals outputted from the respective Hall sensors 162.

Incidentally, each Hall sensor 162 is connected to an unshown exterior connector, via an unshown sensor terminal disposed in the connector section 153, by an unshown lead board embedded into the connector unit 142 by an insertion-molding, and the pulse signal outputted from each Hall sensor 162 is inputted via the exterior connector into an unshown controlling apparatus for motor control. Further, the controlling apparatus controls an operation of the electric motor 17 based on a revolution speed and a rotating direction of the armature shaft 118 that are recognized from the inputted pulse signals.

When the drive mechanism 14 is attached to the electric motor 17, the plate portion 154 of the connector unit 142 is disposed so as to overlap with the base portion 125b of the brush holder 125 axially. Therefore, the brush holder 125 is dipped and fixed between the plate portion 154 and the stepped portion 128 of the motor yoke 115.

Here, as shown in FIG. 5, the base portion 125b of the brush holder 125 is provided with three engaging holes 164 that are open toward the housing 15 side; and as shown in FIG. 8, the plate portion 154 of the connector unit 142 is provided integrally with three engaging protrusions 165 that protrude toward the electric motor 17 side. Further, when the engaging protrusions 165 provided in the connector unit 142 are engaged with the corresponding engaging holes 164 provided in the brush holder 125, the intermediate portion 152 is intended to be positioned with respect to the brush holder 125.

An annular seal member 166 is mounted on the intermediate portion 152 so as to be covered with the intermediate portion. Quality of a material of the seal member 166 is an elastomer material such as synthetic rubber, and is formed integrally with the intermediate portion 152 by a two-color molding. Also, when the drive mechanism 14 is assembled to the electric motor 17, the seal member 166 is intended to be sandwiched between the flange portion 115b of the motor yoke 115 and the intermediate portion 152, and between the housing 15 and the intermediate portion 152. Namely, the intermediate portion 152 is intended to be clipped and fixed (sandwiched and fixed) also between the flange portion 115b of the motor yoke 115 and the housing 15 via the seal member 166. Therefore, even if such a structure is adopted that the connector unit 142 is fixed by sandwiching the intermediate portion 152 between the motor yoke 115 and the housing 15, since the seal member 166 contacts with the flange portion 115b of the motor yoke 115 and the opening end of the housing 15, foreign substances such as rain and dust can be prevented from intruding therein from its clipped portion.

Incidentally, in an example shown in FIGS. 8 and 9, the seal member 166 is formed integrally with the intermediate portion 152 by the two-color molding; however, formation of the seal member and the intermediate portion is not limited to such an example, and the seal member 166 formed separately from the intermediate portion 152 may be attached to the intermediate portion 152 so as to be positioned between the flange portion 115b of the motor yoke 115 and the intermediate portion 152, and between the housing 15 and the intermediate portion 152.

Meanwhile, the connector section 153 is formed, as shown in FIGS. 4 and 9, into a box shape whose one end is opened and which has a rectangular cross section, and is formed integrally with the dipping portion 152 via a linking portion 167 protruding from between the motor yoke 115 and the housing 15. Also, the connector section 153 is disposed outside the housing 15 and motor yoke 115 so as to be adjacent to the housing 15, and is connected to an exterior connector (not shown) provided to a vehicle side. Note that when the connector unit 142 is mounted into the housing 15, the linking portion 167 is guided by the guide portion 143b and positioned at a predetermined location.

A pair of lead boards formed of conductive plate materials such as cupper plates is embedded into the connector unit 142 by an insertion-molding, and by making one ends of those lead boards protrude into the connector section 153, a pair of power-supply connecting terminals 171 is provided inside the connector section 153. Also, when the exterior connector is connected to the connector section 153, each power-supply connecting terminal 171 is connected to the controlling apparatus via the exterior connector.

The other ends of the pair of lead boards that are embedded into the connector unit 142 and described above protrude, from the plate portion 154 inside the dipping portion 152, toward an axial direction located on a side of attaching the motor yoke 115. Therefore, as shown in FIG. 8, a pair of connector-side connecting terminals 172 is provided inside the dipping portion 152. The respective connector-side connecting terminals 172 protrude axially from the plate portion 154 toward a brush holder 125 side, and are arranged mutually alongside.

Incidentally, in an example shown in FIGS. 8 and 9, the connector-side connecting terminals 172 are formed by the power-supply connecting terminals 171 and the lead board, and become in states of being electrically connected to the power-supply connecting terminals 171; however, connection of both terminals is not limited to such an example, and the connector-side connecting terminals 172 and the power-supply connecting terminals 171, which are formed separately from each other, may be electrically connected by the lead board.

Meanwhile, as shown in FIG. 5, a pair of brush-side connecting terminals 173 is provided in the brush holder 125 opposite the connector-side connecting terminals 172 of the connector unit 142. Those brush-side connecting terminals 173 are formed of conductive plate materials such as cupper plates, and each have a connecting hole 173a with a rectangular cross section. Those connecting holes 173a are formed with dimensions corresponding to the connector-side connecting terminals 172, and each brush-side connecting terminal 173 is fixed in alignment with the base portion 125b of the brush holder 125 so that those connecting holes 173a are opened toward the housing 15 side. Also, as shown in FIG. 6, the brush-side connecting terminals 173 are provided with plate-like connecting portions 173b, and those connecting portions 173b are electrically connected to the corresponding brushes 126 via lead boards 174 and 175, respectively.

Incidentally, to protect the armature coil 122 from an overcurrent, a circuit breaker 176 is connected between the lead board 174 and the brush 126.

Figure 10:
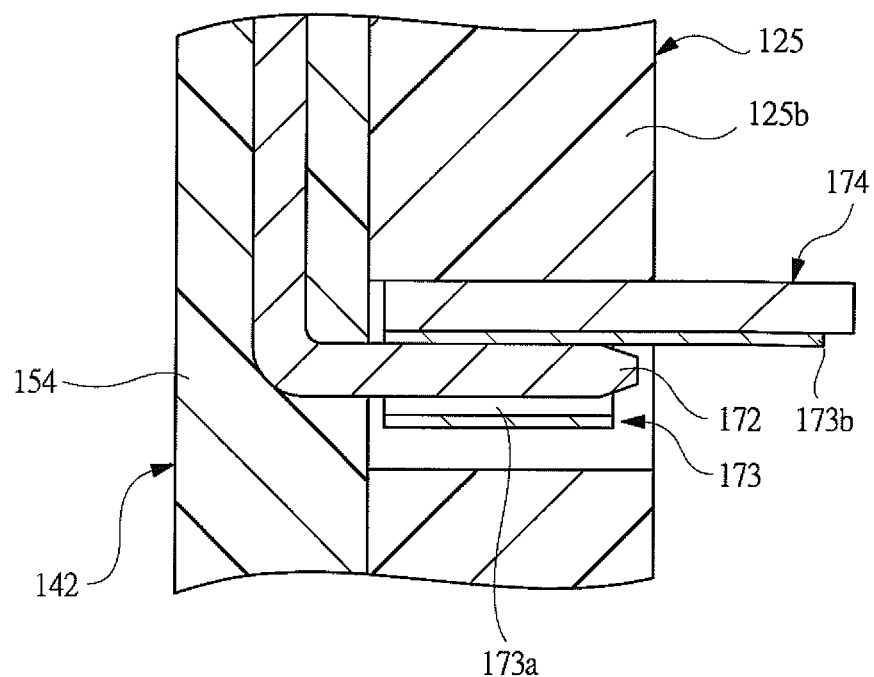
FIG. 10 is a sectional view showing a detail of a connection portion of a brush-side connecting terminal and a connector-side connecting terminal.

FIG. 10 is a sectional view showing a detail of a connection portion between the brush-side connecting terminal 173 and the connector-side connecting terminal 172. When the intermediate portion 152 is disposed so as to overlap with the brush holder 125 axially, the connector-side connecting terminals 172 are inserted into the connecting holes 173a of the corresponding brush-side connecting terminals 173, and are electrically connected to the brush-side connecting terminals 173. Therefore, a drive current, which is fed to the controlling apparatus via the exterior connector, can be fed to the respective brushes 126 via the power-supply connecting terminals 171 of the connector section 153, the connector-side connecting terminals 172, and the brush-side connecting terminals 173.

Figure 11:
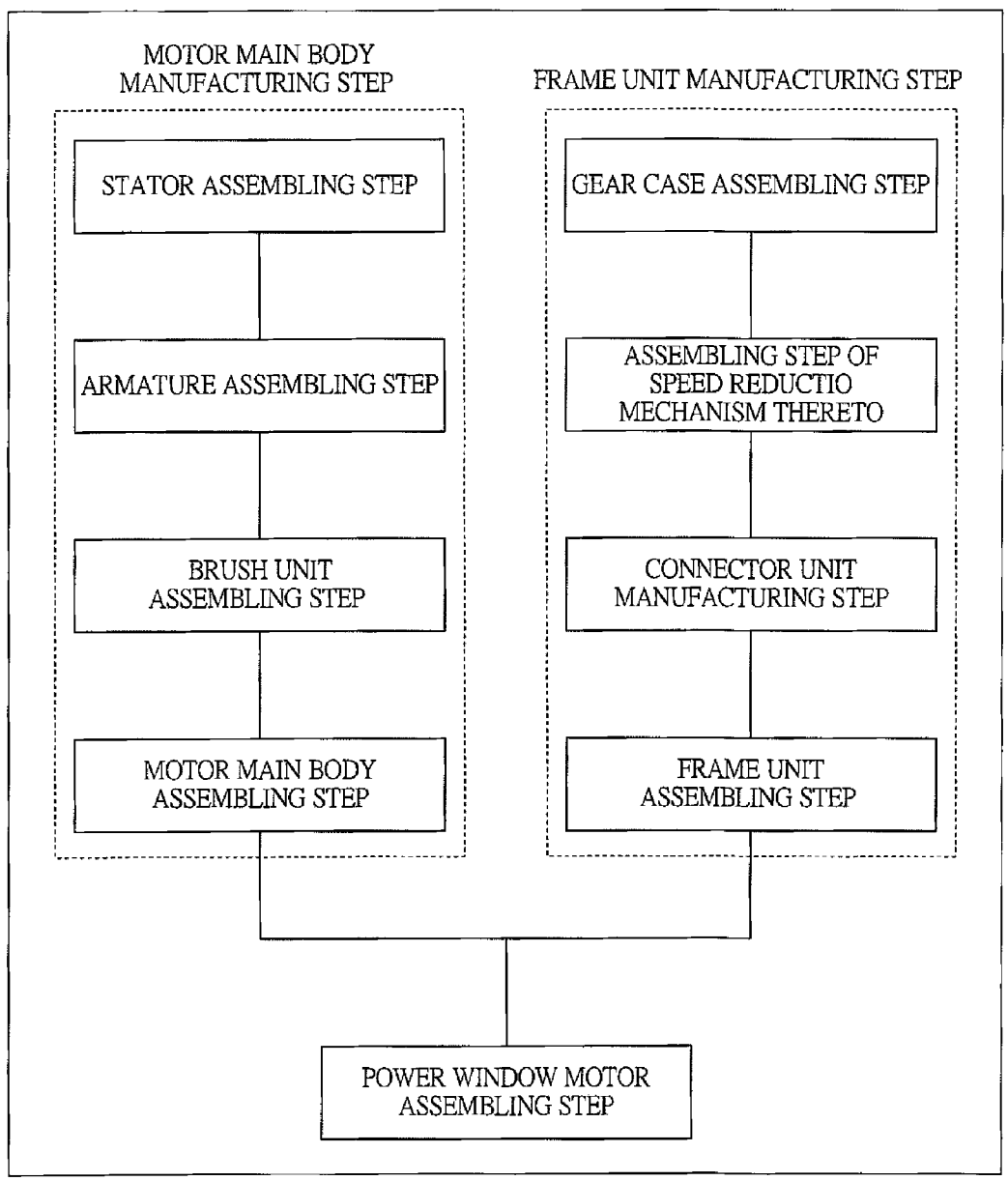
FIG. 11 is a process drawing showing a manufacturing process of the vehicle window opening/closing device illustrated in FIG. 4.
Figure 12A:
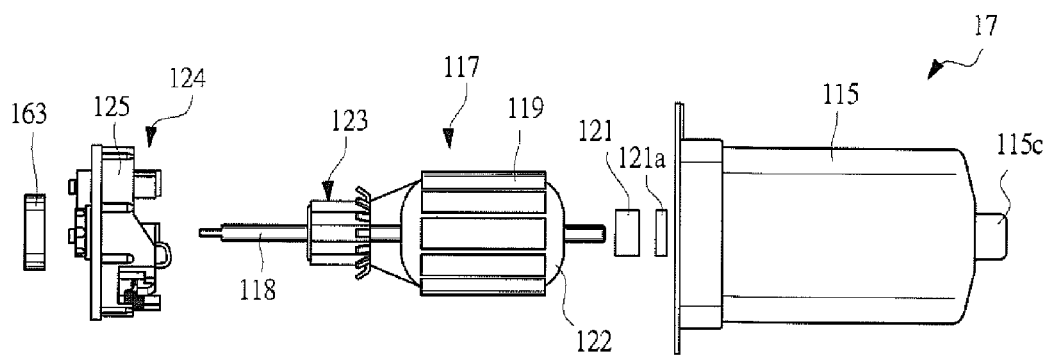
FIGS. 12A and 12B are views each showing an assembling step of the motor main body.
Figure 12B:
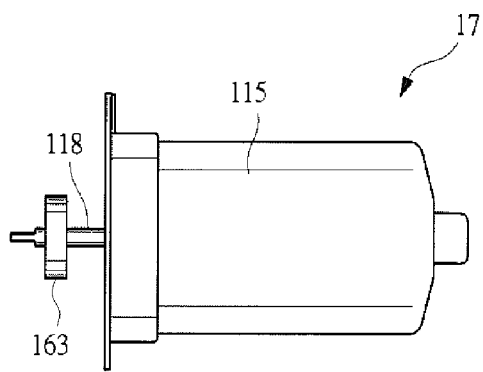
Figure 13A:
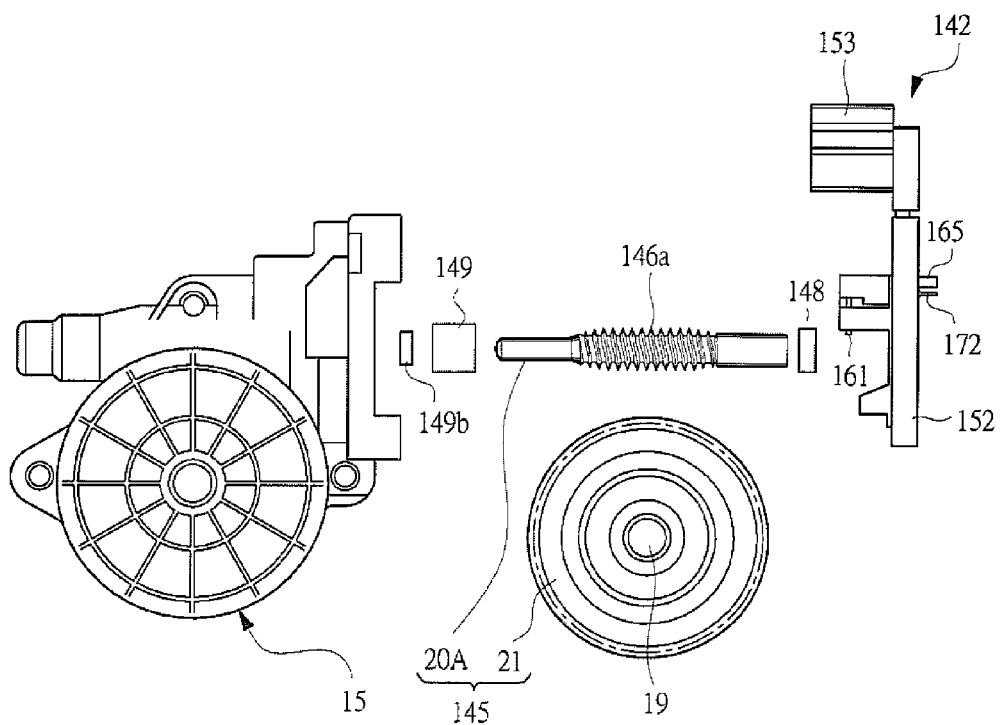
FIGS. 13A and 13B are views each showing an assembling step of the frame unit.
Figure 13B:
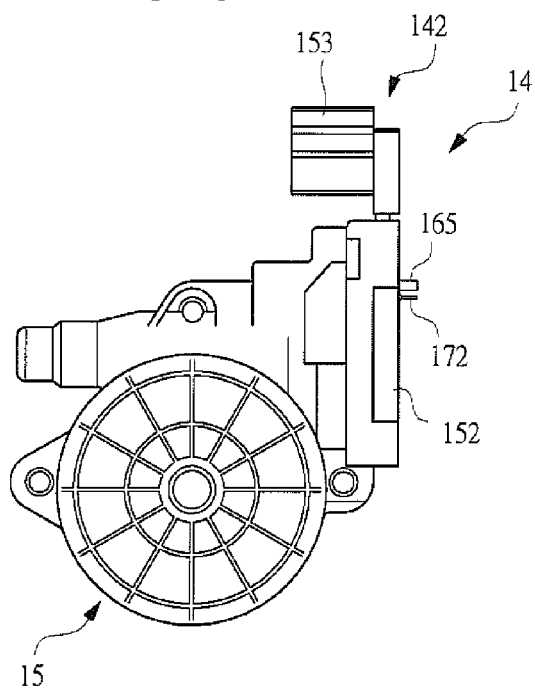
Figure 14A:
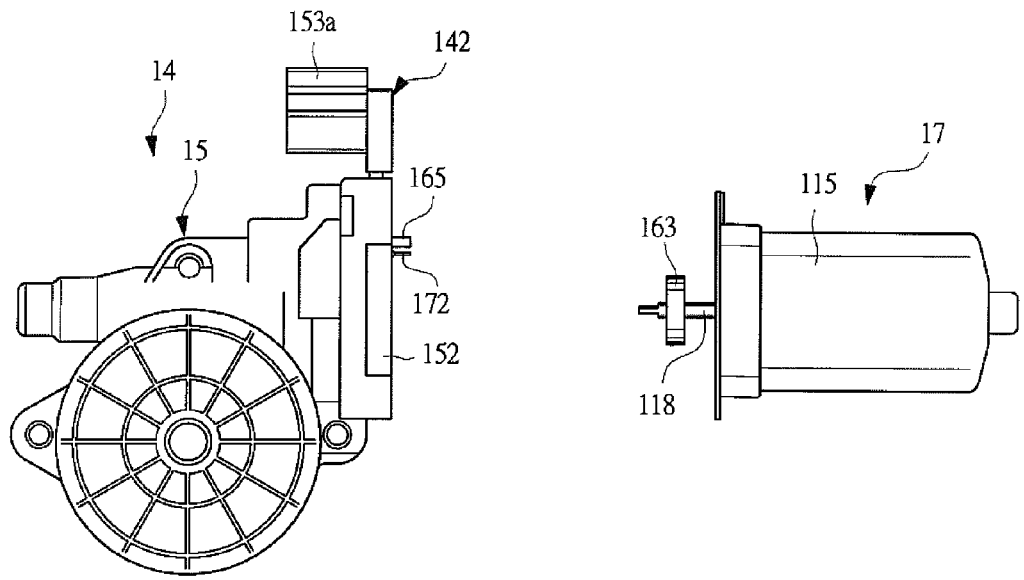
FIGS. 14A and 14B are views each showing a step of assembling the motor main body and the frame unit to each other.
Figure 14B:
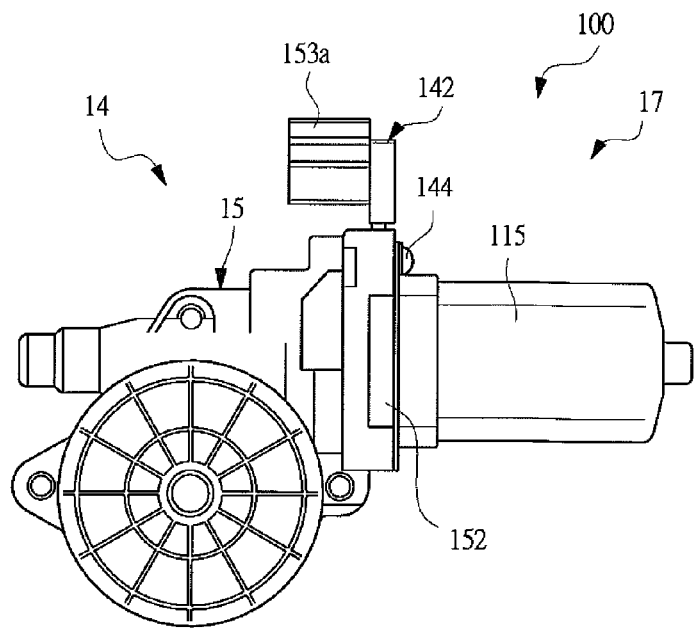

FIG. 11 is a process drawing showing a manufacturing process of the vehicle window opening/closing device 1 (power window motor 100) illustrated in FIG. 4; FIGS. 12A and 12B are views each showing an assembling step of a motor main body; FIGS. 13A and 13B are views each showing an assembling step of the drive mechanism 14; and FIGS. 14A and 14B are views each showing a step of assembling the electric motor 17 and the drive mechanism 14 to each other.

Next, a manufacturing method of the vehicle window opening/closing device 1 (power window motor 100) will be described based on FIGS. 11 to 14. Note that FIGS. 13A, 13B, 14A, and 14B are shown by omitting the guide rail mounting portion 18.

As shown in FIG. 11, in the manufacturing method of this vehicle window opening/closing device 1 (power window motor 100), the electric motor 17 and the drive mechanism 14 are manufactured by mutually different manufacture lines, namely, by a parallel system in which a manufacturing process of the electric motor 17 and a manufacturing process of the drive mechanism 14 are carried in parallel.

As shown in FIG. 12A, in the manufacturing process of the electric motor 17, firstly carried out is a stator assembling step in which the pair magnets 116 are mounted on an inner face of the motor yoke 115, and the bearing 121 is held in the baring supporting portion 115c provided to the bottom wall portion 115a of the motor yoke 115, whereby the stator 114 is assembled. Then, carried out is an armature assembling step in which the commutator 123 and the armature core 119 are fixed to the armature shalt 118; the armature coil 122 is wound around the armature core 119; and its coil end is connected to the commutator 123, whereby the armature 117 is assembled. Next, carried out is a brush unit assembling step in which the pair of brushes 126, the spring 133, and the brush-side connecting terminal 173, etc. are attached to the resin-molded brush holder 125, whereby the brush unit 124 is assembled. Further, when the ring magnet 163 is prepared in addition to the stator 114, armature 117, and brush unit 124, then carried out is a motor main body assembling step in which the armature 117 and brush unit 124 are assembled to the stator 114; and the ring magnet 163 is fixed to the armature shalt 118, whereby as shown in FIG. 12B, the electric motor 17 is completed. Note that the bearing 112 may be constituted so as to be previously fixed to the end portion of the armature shalt 118.

Meanwhile, as shown in FIG. 13A, in the manufacturing process of the drive mechanism 14, firstly carried out is a housing assembling step in which the housing main body 15a whose support shaft 19 is insert-molded is prepared. Then, carried out is a speed reduction mechanism assembling step in which the worm shaft 20A is assembled to the housing main body 15a; the worm wheel 21, damper 23, and drum 22 are assembled thereto from the opening 15c side; and the opening 15c is closed by the lid 28 to assemble the speed reduction mechanism 145. Next, carried out is a connector unit manufacturing step in which by using a resin material to insert-mold the lead board, the connector section 153 with the power-supply connecting terminals 171, the plate portion 154 with the connector-side connecting terminals 172, and the intermediate portion 152 are formed; and the sensor substrate 161 is assembled to such formation, whereby the connector unit 142 is assembled. Further, when the speed reduction mechanism 145 and connector unit 142 are prepared, then carried out is a frame unit assembling step in which the connector unit 142 is mounted in the drive mechanism 14, and as shown in FIG. 13B, the drive mechanism 14 is completed.

When the drive mechanism 14 manufactured through the frame unit assembling step is prepared, the lower end portion of the guide rail 10 is inserted into and engaged with a slit (not shown) of the guide rail mounting portion 18 provided integrally with the housing main body 15a, whereby both is unitized. The carrier plate 11 is previously attached longitudinally movably to the guide rail 10, and the other ends of the respective cables 24 and 25 extending from the drive mechanism 14 are coupled to the carrier plate 11, whereby the vehicle window opening/closing device 1 without the electric motor 17 is completed.

As shown in FIG. 14A, when the electric motor 17 manufactured through the motor main body assembling step and the drive mechanism 14 manufactured through the above-mentioned step are prepared, next carried out is a motor assembling step in which the housing 15 of the drive mechanism 14 is fixed to the flange portion 115b of the electric motor 17 so that the intermediate portion 152 of the connector unit 142 is dipped (sandwiched) between the motor yoke 115 and housing 15. In this case, the brush holder 125 slightly press-fitted in the inner face of the motor yoke 115 is also clipped and fixed between the stepped portion 128 of the motor yoke 115 and the plate portion 154.

Further, the coupling convex portion 118a provided to the armature shaft 118 is inserted into the coupling hole 146b provided to the worm shaft 20A, and the worm shaft 20A is mechanically coupled to the armature shaft 29A. Also, the connector-side connecting terminals 172 provided to the connector unit 142 are electrically connected to the brush-side connecting terminals 173 provided to the brush holder 125, and the respective brushes 126 are electrically connected to the power-supply connecting terminals 171 of the connector section 153 connected to the exterior connector. Therefore, the drive mechanism 14 is assembled to the electric motor 17, and the vehicle window opening/closing device 1 (power window motor 100) is completed.

Figure 15:
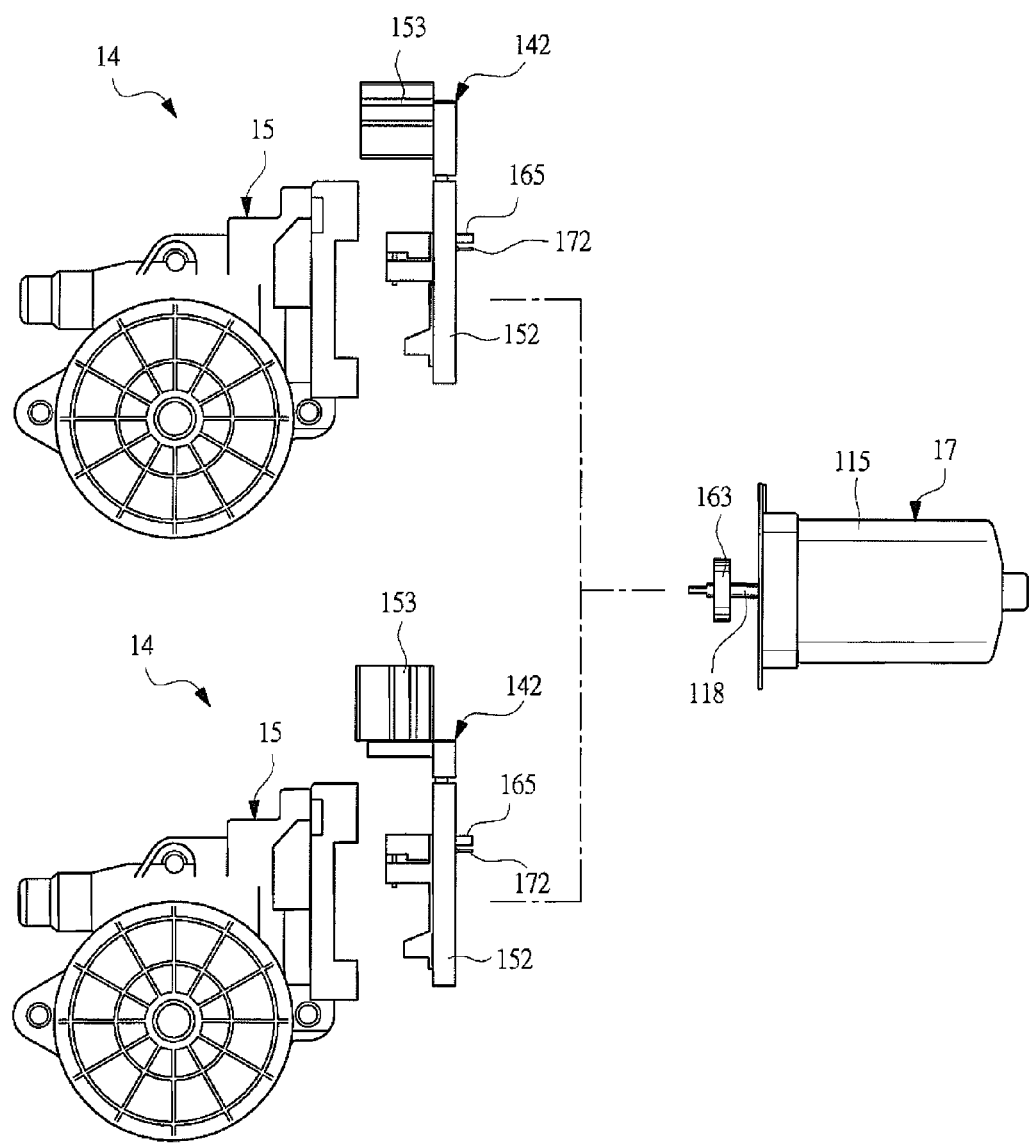
FIG. 15 is an explanatory view concerning a manufacturing method of two kinds of vehicle window opening/closing devices different in a specification of a connector section.

FIG. 15 is an explanatory view concerning a manufacturing method of two kinds of vehicle window opening/closing devices 1 (power window motor 100) different in a specification of the connector section. Note that FIG. 15 is also shown by omitting the guide rail mounting portion 18.

In the vehicle window opening/closing device 1 (power window motor 100), the connector unit 142 with the power-feeding connector portion 153 is formed separately from the brush holder 125, and since this connector unit 142 is fixed so as to be sandwiched between the drive mechanism 14 and electric motor 17, the specification of the brush holder 125 can be easily adapted, without any change, to variation of the specification of the exterior connector by changing only the specification of the connector unit 142.

For example, as shown in FIG. 15, in manufacturing the vehicle window opening/closing device 1 (power window motor 100) with two specifications different in an inserting direction of the connector section 153, the drive mechanism 14 and the electric motor 17, i.e., brush holder 125 that have the same specification are used, and by preparing as the connector unit 142 two kinds of connector units different in a specification of the connector section 153, the power window motors 100 with two specifications can be easily manufactured. Therefore, a working flow can be arbitrarily set in electrically connecting the vehicle window opening/closing device 1 and the exterior connector located on a vehicle body side, and a manufacturing flow of the connector section 153 can be set to a better one for workability of coupling the exterior connector according to a kind of vehicle.

Thus, in this vehicle window opening/closing device 1 (power window motor 100), since the connector unit 142 with the power-feeding connector portion 153 is formed separately from the brush holder 125, even when two or more kinds of vehicle window opening/closing devices 1 (power window motor 100) different in the specification of the connector section 153 correspondingly to the exterior connector are manufactured, the brush holder 125 with a specification common to those members can be used. Therefore, versatility of the brush holder 125 with respect to a specification difference of the exterior connector is enhanced, and the vehicle window opening/closing device 1 (power window motor 100) can be reduced in cost.

Further, in the vehicle window opening/closing device 1 (power window motor 100), by disposing the dipping portion 152 of the connector unit 142 so as to overlap with the base portion 125*b* of the brush holder 125 axially, the brush-side connecting terminals 173 provided to the brush holder 125 and the connector-side connecting terminals 172 provided to the connector unit 142 are electrically connected to one another, and the brushes 126 are connected to the power-supply connecting terminals 171 provided to the connector section 153, respectively. Accordingly, even if such a constitution is adopted that the connector unit 142 and the brush holder 125 are separate from each other, the brushes 126 and the power-supply connecting terminals 171 can be electrically connected using a simple constitution, respectively.

Meanwhile, in the vehicle window opening/closing device 1 (power window motor 100), the armature shaft 118 of the electric motor 17 is divided from the worm shaft 20A so as to be coupled to the worm shaft 20A of the drive mechanism 14, and is rotatably supported by the motor yoke 115 and brush holder 125 when the electric motor 17 is completed. Accordingly, even if the drive mechanism 14 is not attached to the electric motor 17, the armature shaft 118, i.e., armature 117 becomes in a rotatable state. Further, the pair of brush-side connecting terminals 173, which is electrically connected to the brushes 126, is provided to the brush holder 125 in a state of being exposed to the outside from the brush holder 125. Therefore, by connecting power supply directly to those brush-side connecting terminals 173, the electric motor 17 can be actuated as a single body.

Thus, in the vehicle window opening/closing device 1 (power window motor 100), since the electric motor 17 is constituted as one unit that is operable as a single body even if being not attached to the drive mechanism 14 and connector unit 142, as shown in FIG. 11 the electric motor 17 can be manufactured in a manufacturing line different from that of the drive mechanism 14. Therefore, even in the case where two or more kinds of vehicle window opening/closing devices 1 (power window motor 100) different in the specification of the connector section 153 are manufactured, the electric motor 17 used for all of those specifications can be efficiently manufactured by an intensive production.

Also, in the vehicle window opening/closing device 1 (power window motor 100), since the electric motor 17 is formed into a small and simple shape having no connector section 153, a transport cost can be reduced in transporting the electric motor 17 to bases for assembly with the drive mechanism 14.

Further, in the vehicle window opening/closing device 1 (power window motor 100), since the electric motors 17 can be actuated as single bodies, their actuation can be inspected before transportation of the intensively produced electric motors 17 to the respective bases. Therefore, the electric motors 17 with high reliability of actuation can be transported to the respective bases.

Needless to say, the present invention is not limited to the above embodiments, and may be variously modified within a range of not departing from the gist of the present invention. For example, in the above embodiment, the plurality of vehicle attaching legs 16 is provided integrally with the housing main body 15*a*, but is not limited to the housing main body, and may be provided on a lid 28 side.

Further, in the above embodiment, the metal support shaft 19 is shown by inserting the flange portion 19*a* into the housing main body 15*a* and molding both members, but is not limited to such an insertion-molding, and the support shaft 19 may use the same resin material as that of the housing main body 15*a* to be shaped integrally with the housing main body.

The present invention can be used in manufacturing the vehicle window opening/closing device in which the drive mechanism is made thin, the entire device is made compact, and the degree of freedom of layout is enhanced.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A vehicle window opening and closing device for causing a window glass to rise and fall, comprising:
  a carrier plate for supporting the window glass;
  a guide rail for supporting the carrier plate so that the carrier plate is movable along the guide rail;
  an inversion pulley rotatably fixed to an upper portion of the guide rail;
  a cable member located along the guide rail and coupled to the carrier plate via the inversion pulley, the cable member having end portions;
  a drive mechanism for driving the cable member; and
  an electric motor unit having a reversible electric motor coupled mechanically to the drive mechanism and a connector unit through which electric power is supplied to the electric motor,
  wherein the electric motor has:
    a motor yoke;
    a pair of magnets fixed on an inner surface of the motor yoke; and
    an armature having an armature shaft rotatably supported by the motor yoke, the armature being received in the motor yoke and located between the magnets, the armature shaft having a first tip portion provided with a coupling mechanism;
    a commutator having a plurality of segment pieces, the commutator being fixed to the armature shaft of the armature; and
    a brush unit having a pair of brushes which slidably contact with the segment pieces of the commutator, the brush unit being received and held in the motor yoke by press-fit,
  wherein the connector unit is detachably connected to the brush unit of the electric motor, the connector unit having:
    an intermediate portion having a first pair of connecting terminals through which electric power is supplied to the brushes of the brush unit of the electric motor, the intermediate portion being integrally formed with a connector by an injection molding of resin material, the connector having a second pair of connecting terminals electrically connected to the respective first pair of connecting terminals of the intermediate portion, the intermediate portion having a through hole through which the armature shaft is introduced, wherein the drive mechanism has:
- a housing having a guide portion for guiding the intermediate portion of the connector unit of the motor unit to support the intermediate portion;
- a drum received in the housing and rotatably supported by the housing, the end portions of the cable member being wound around the drum;
  - a worm wheel concentrically received in the housing and connected to the drum; and
  - a worm received in the housing, rotatably supported by the housing, and engaged with the worm wheel, the worm having a second tip portion provided with a coupling mechanism, wherein the intermediate portion of the connector unit is held between the motor yoke of the electric motor and the housing of the drive mechanism with the armature shaft being introduced through the through hole of the intermediate portion, wherein the housing of the drive mechanism is integrally formed with a guide rail mounting portion having a slot, wherein one end portion of the guide rail is inserted into the slot of the guide rail mounting portion, wherein the drum has a large diameter portion and a small diameter portion, a ring plate is fixedly provided in an inner face of the housing, a seal lip is attached to an inner circumference of the ring plate so as to slidably contact with the small diameter portion of the drum, and wherein the connector unit further has rotating sensors that are arranged so as to axially oppose a ring magnet fixed on the armature shaft.

2. The vehicle window opening and closing device according to claim 1, wherein when the drive mechanism and the electric motor are connected to each other, the brush unit of the electric motor is clamped between the motor yoke of the electric motor and the intermediate portion of the connector unit, whereby the brush unit of the electric motor is held in the motor yoke of the electric motor.

3. The vehicle window opening and closing device according to claim 1, wherein when the drive mechanism and the electric motor are connected to each other, the connecting terminals of the intermediate portion of the connector unit are electrically connected to the respective brushes of the brush unit of the electric motor.

4. The vehicle window opening and closing device according to claim 1, wherein when the drive mechanism and the electric motor are connected to each other, the coupling mechanism of the armature shaft of the electric motor is coupled to the coupling mechanism of the worm of the drive mechanism.

5. The vehicle window opening and closing device according to claim 1, wherein the intermediate portion of the connector unit of the motor unit has a plurality of first ribs as press-fit members, and wherein the intermediate portion of the connector unit of the motor unit is held by the first ribs in the drive mechanism, when the intermediate portion of the connector unit is received in the guide portion of the drive mechanism.

6. The vehicle window opening and closing device according to claim 2, wherein the brush unit has a plurality of second ribs as press-fit members, and wherein the brush unit is held by the second ribs in the motor yoke of the electric motor, when the brush unit is received in the motor yoke.

7. The vehicle window opening and closing device according to claim 1, wherein the connector section of the connector unit is arranged in parallel with the direction of the armature shaft of the electric motor.

8. The vehicle window opening and closing device according to claim 2, wherein the connector section of the connector unit is vertically arranged with respect to the direction of the armature shaft of the electric motor.

9. The vehicle window opening and closing device according to claim 2, wherein when the drive mechanism and the electric motor are connected to each other, the connecting terminals of the intermediate portion of the connector unit are electrically connected to the respective brushes of the brush unit of the electric motor.

10. The vehicle window opening and closing device according to claim 9, wherein when the drive mechanism and the electric motor are connected to each other, the coupling mechanism of the armature shaft of the electric motor is coupled to the coupling mechanism of the worm of the drive mechanism.

11. The vehicle window opening and closing device according to claim 10, wherein the intermediate portion of the connector unit has a plurality of first ribs as press-fit members, and wherein the intermediate portion of the connector unit is held by the first ribs in the drive mechanism, when the intermediate portion of the connector unit is received in the guide portion of the drive mechanism.

12. The vehicle window opening and closing device according to claim 10, wherein the connector section of the connector unit is arranged in parallel with the direction of the armature shaft of the electric motor.

13. The vehicle window opening and closing device according to claim 10, wherein the connector section of the connector unit is vertically arranged with respect to the direction of the armature shaft of the electric motor.

14. The vehicle window opening and closing device according to claim 11, wherein the brush unit has a plurality of second ribs as press-fit members, and wherein the brush unit is held by the second ribs in the motor yoke, when the brush unit is received in the motor yoke.

15. The vehicle window opening and closing device according to claim 3, wherein when the drive mechanism and the electric motor are connected to each other, the coupling mechanism of the armature shaft of the electric motor is coupled to the coupling mechanism of the worm of the drive mechanism.

16. The vehicle window opening and closing device according to claim 15, wherein the intermediate portion of the connector unit has a plurality of first ribs as press-fit members, and wherein the intermediate portion of the connector unit is held by the first ribs in the drive mechanism, when the intermediate portion of the connector unit is received in the guide portion of the drive mechanism.

17. The vehicle window opening and closing device according to claim 15, wherein the connector section of the connector unit is arranged in parallel with the direction of the armature shaft of the electric motor.

18. The vehicle window opening and closing device according to claim 15, wherein the connector section of the connector unit is vertically arranged with respect to the direction of the armature shaft of the electric motor.

19. The vehicle window opening and closing device according to claim 14, wherein the connector section of the connector unit is arranged in parallel with the direction of the armature shaft of the electric motor.

20. The vehicle window opening and closing device according to claim 14, wherein the connector section of the connector unit is vertically arranged with respect to the direction of the armature shaft of the electric motor.

* * * * *